(12) United States Patent
Fuller et al.

(10) Patent No.: US 6,833,865 B1
(45) Date of Patent: Dec. 21, 2004

(54) EMBEDDED METADATA ENGINES IN DIGITAL CAPTURE DEVICES

(75) Inventors: Charles Fuller, Foster City, CA (US); Mojgan Monika Gorkani, San Francisco, CA (US); Richard D. Humphrey, San Mateo, CA (US)

(73) Assignee: Virage, Inc., San Mateo, CA (US)

( * ) Notice: Subject to any disclaimer, the term of this patent is extended or adjusted under 35 U.S.C. 154(b) by 0 days.

(21) Appl. No.: 09/363,973

(22) Filed: Jul. 29, 1999

Related U.S. Application Data

(60) Provisional application No. 60/098,781, filed on Sep. 1, 1998.

(51) Int. Cl.[7] .......................... H04N 5/76; H04N 5/262; G06K 9/68

(52) U.S. Cl. ..................... 348/231.2; 348/239; 382/218

(58) Field of Search ......................... 348/231.99, 231.2, 348/231.3, 231.4, 231.5, 231.6, 239, 211.4, 211.9, 552; 382/227, 218, 194, 170

(56) References Cited

U.S. PATENT DOCUMENTS

| 4,115,805 | A | | 9/1978 | Morton |
| 4,334,241 | A | | 6/1982 | Kashioka et al. |
| 4,574,319 | A | | 3/1986 | Konishi |
| 5,335,072 | A | | 8/1994 | Tanaka et al. |
| 5,506,644 | A | | 4/1996 | Suzuki et al. |
| 5,633,678 | A | | 5/1997 | Parulski et al. |
| 5,642,285 | A | | 6/1997 | Woo et al. |
| 5,657,077 | A | | 8/1997 | DeAngelis et al. |
| 5,682,458 | A | | 10/1997 | Funazaki |
| 5,692,104 | A | * | 11/1997 | Chow et al. ................. 704/253 |
| 5,706,457 | A | | 1/1998 | Dwyer et al. |
| 5,796,428 | A | * | 8/1998 | Matsumoto et al. ... 348/207.99 |
| 5,815,201 | A | * | 9/1998 | Hashimoto et al. ...... 348/231.4 |
| 5,828,809 | A | * | 10/1998 | Chang et al. ................. 386/69 |
| 5,835,667 | A | | 11/1998 | Wactlar et al. |
| 5,872,865 | A | * | 2/1999 | Normile et al. ............. 382/224 |
| 5,889,578 | A | * | 3/1999 | Jamzadeh ..................... 348/97 |
| 5,893,095 | A | * | 4/1999 | Jain et al. ...................... 707/6 |
| 6,014,183 | A | | 1/2000 | Hoang |
| 6,115,717 | A | * | 9/2000 | Mehrotra et al. ........... 707/102 |
| 6,462,778 | B1 | * | 10/2002 | Abram et al. ............... 348/239 |
| 6,505,160 | B1 | * | 1/2003 | Levy et al. .................. 709/219 |
| 6,526,215 | B2 | * | 2/2003 | Hirai et al. .................. 345/723 |
| 6,606,117 | B1 | * | 8/2003 | Windle ........................ 348/239 |
| 2001/0012062 | A1 | * | 8/2001 | Anderson .................... 348/231 |
| 2002/0191087 | A1 | * | 12/2002 | Hashimoto et al. ...... 348/231.3 |

OTHER PUBLICATIONS

"NEC develops world's first professional quality digital optical disk camera", printed from http://info.nec.co.jp/english/today/newsrel/9611/0701.html on Nov. 30, 1998 (2 pages).

Videotape and Disk Recorders: DVCAM: DSR1, printed from http://bpgprod.sel.sony.com/modelfeatures.bpg?cat+Videotape+and+Disk+Recprd . . . on Dec. 17, 1998 (2 pages).

Editors: Non–Linear: ES7, printed from http://bpgprod.sel.sony.com/modelfeatures.bpg?cat=Editors&subcat=Non–Linear@model+ES7 on Dec. 17, 1998 (2 pages).

(List continued on next page.)

Primary Examiner—Wendy R. Garber
Assistant Examiner—John M Villecco
(74) Attorney, Agent, or Firm—Knobbe Martens Olson & Bear LLP

(57) ABSTRACT

A digital capture system, such as a digital still camera or digital video recorder, has an embedded real-time content-based analysis function in the capture device to extract metadata from the digital signals. In one embodiment, metadata (descriptive information about the digital content) is formatted and stored separately from the content. In another embodiment, the metadata may be formatted and combined with the digital content in a container format such as MPEG-7, QuickTime, or FlashPix.

41 Claims, 6 Drawing Sheets

OTHER PUBLICATIONS

Luther, Arch C., "Video Camera Technology", 1998, Figure 4.1.1 Signal Processing Block Diagram (3 pages total).

"Overview of the MPEG-4 Standard", International Organisation for Standardisation, printed from http://dgrogo.cselt.stet.it/mpeg/standards/mpeg-4/mpeg-4.htm on Oct. 6, 1998 (42 pages).

"Frequently Asked Questions on MPEG-4 Video", International Organisation for Standardisation, printed from http://dgrogo.cselt.stet.it/mpeg/faq/faq-video.htm on Oct. 6, 1998 (7 pages).

"MPEG-7 Context and Objectives", International; Organisation for Standardisation, printed from http://drogo.cselt.stet.it/mpeg/standards/mpeg-7/mpeg-7.htm on Oct. 6, 1998 (9 pages).

"MPEG-7 Frequently Asked Questions", International Organisation for Standardisation, printed from http://drogo.cselt.stet.it/mpeg/faq/faq_mpeg-7.htm on Oct. 6, 1998 (3 pages).

Rigby, Martin, "What is FlashPix?", 1996, printed from http://www.flashpix.com/WhatIsfpx.html on Oct. 6, 1998 (1 page).

"How Flashpix Works", 1996, printed from http://www.digitalimaging.org/flashpix_howitworks.html on Oct. 6, 1998 (2 pages).

"How to make computer-ready FlashPix images.", 1996, printed from http://www.flashpix.com/howtofpx/howtofpx.html on Oct. 6, 1998 (1 page).

* cited by examiner

EMBEDDED METADATA ENGINES IN DIGITAL CAPTURE DEVICES

This application claims the benefit, under 35 U.S.C. § 119(e), of U.S. Provisional Application No. 60/098,781, filed Sep. 1, 1998. U.S. patent application Ser. No. 09/363,974, entitled "INTEGRATED DATA AND REAL-TIME METADATA CAPTURE SYSTEM AND METHOD", filed Jul. 29, 1999, which is a continuation-in-part application of U.S. patent application Ser. No. 09/134,497, entitled "VIDEO CATALOGER SYSTEM WITH SYNCHRONIZED ENCODERS", filed Aug. 14, 1998, now U.S. Pat. No. 6,360,234, which takes priority under 35 U.S.C. § 119(e) to U.S. patent application Ser. No. 60/055,751, entitled "VIRAGE VIDEO ENGINE", filed Aug. 14, 1997, have subject matter that is related to this application or was filed on the same day.

GOVERNMENTAL RIGHTS

This invention was made with Government support under Contract No. DAAH01-97-C-R190, awarded by U.S. Army Aviation and Missile Command. The Government may have certain rights in this invention.

BACKGROUND OF THE INVENTION

1. Field of the Invention

The present invention relates generally to digital capture devices, and more particularly, to digital still cameras, digital video cameras, digital video encoders and other media capture devices.

2. Description of the Related Technology

The distinction between still devices and motion devices is becomming blurred as many of these devices can perform both functions, or combine audio capture with still image capture. The capture of digital content is expanding rapidly due to the proliferation of digital still cameras, digital video cameras, and digital television broadcasts. Users of this equipment generally also use digital production and authoring equipment. Storing, retrieving, and manipulating the digital content represent a significant problem in these environments. The use of various forms of metadata (data about the digital content) has emerged as a way to organize the digital content in databases and other storage means such that a specific piece of content may be easily found and used.

Digital media asset management systems (DMMSs) from several vendors are being used to perform the storage and management function in digital production environments. Examples include Cinebase, WebWare, EDS/MediaVault, Thomson Teams, and others. Each of these systems exploit metadata to allow constrained searches for specific digital content. The metadata is generated during a logging process when the digital content is entered into the DMMS. Metadata generally falls into two broad categories:

Collateral metadata: information such as date, time, camera properties, and user labels or annotations, and so forth;
  Content-based metadata: information extracted automatically by analyzing the audiovisual signal and extracting properties from it, such as keyframes, speech-to-text, speaker ID, visual properties, face identification/recognition, optical character recognition (OCR), and so forth.

Products such as the Virage VideoLogger perform the capture and logging of both of these types of metadata. The VideoLogger interfaces with the DMMS to provide the metadata to the storage system for later use in search and retrieval operations. These types of systems can operate with digital or analog sources of audiovisual content.

The capture of digital content offers an opportunity which is not present in analog capture devices. What is desired is a capability to embed a content-based analysis function in the capture device for extracting metadata from the digital signals in real-time as the content is captured. This metadata could then be later exploited by DMMSs and other systems for indexing, searching, browsing, and editing the digital media content. A central benefit of this approach would be that it is most valuable to capture this type of metadata as far "upstream" as possible. This would allow the metadata to be exploited throughout the lifecycle of the content, thereby reducing costs and improving access to and utilization of the content. Such an approach would be in contrast to the current practice of performing a separate logging process at some point in time after the capture of the content. Therefore, it would be desirable to capture the metadata at the point of content capture, and to perform the analysis in real-time by embedding metadata engines inside of the physical capture devices such as digital still cameras, digital audio/video cameras, and other media capture devices.

Some previous efforts at capturing metadata at the point of content capture have focused on the capture of collateral metadata, such as date/time, or user annotations. Examples of these approaches can be found in U.S. Pat. No. 5,335,072 (sensor information attached to photographs), 4,574,319 (electronic memo for an electronic camera), U.S. Pat. No. 5,633,678 (camera allowing for user categorization of images), U.S. Pat No. 5,682,458 (camera that records shot data on a magnetic recording area of the film), and U.S. Pat. No. 5,506,644 (camera that records GPS satellite position information on a magnetic recording area of the film). In addition, professional digital cameras being sold today offer certain features for annotating the digital content. An example of this is the Sony DXC-D30 (a Digital Video Cassette camera, or DVC) which has a ClipLink feature for marking video clips within the camera prior to transferring data to an editing station.

Many aspects of digital capture devices are well understood and practiced in the state of the art today. Capture sensors, digital conversion and sampling, compression algorithms, signal levels, filtering, and digital formats are common functions in these devices, and are not the object of the present invention. Much information can be found in the literature on these topics. For example, see *Video Demystified* by Keith Jack, published by Harris Semiconductor, for an in-depth description of digital composite video, digital component video, MPEG-1 and MPEG-2.

SUMMARY OF THE INVENTION

The present invention is based on technologies relating to the automatic extraction of metadata descriptions of digital multimedia content such as still images and video. The present invention also incorporates audio analysis engines that are available from third parties within an extensible metadata "engine" framework. These engines perform sophisticated analysis of multimedia content and generate metadata descriptions that can be effectively used to index the content for downstream applications such as search and browse. Metadata generated may include:

Image Feature Vectors
  Keyframe storyboards
  Various text attributes (closed-captioned (CC) text, teletext, time/date, media properties such as frame-rates, bit-rates, annotations, and so forth)

Speech-to-text & keyword spotting

Speaker identification (ID)

Audio classifications & feature vectors

Face identification/recognition

Optical Character Recognition (OCR)

Other customized metadata via extensibility mechanisms: GPS data; camera position & properties; any external collateral data; and so forth.

A central theme of the technical approach is that it is most valuable to capture this type of metadata as far "upstream" as possible. This allows the metadata to be exploited throughout the lifecycle of the content, thereby reducing costs and improving access and utilization of the content. The natural conclusion of this approach is to extract the metadata at the point of content capture. Thus, the present invention embeds metadata engines inside of the physical capture devices such as digital still cameras, digital audio/video cameras, and so forth.

Digital cameras are rapidly advancing in capabilities and market penetration. Megapixel cameras are commonplace. This results in an explosion of digital still content, and the associated problems of storage and retrieval. The visual information retrieval (VIR) image engine available from Virage, Inc. has been used effectively in database environments for several years to address these problems. The computation of image feature vectors used in search and retrieval has to date been part of the back-end processing of image. The present invention pushes that computation to the cameras directly, with the feature vectors naturally associated with the still image all during its life. A practical "container" for this combined image+feature vector is the FlashPix image format, which is designed to carry various forms of metadata along with the image. Image feature vectors may also be stored separately from the image.

Digital video cameras are also advancing rapidly, and are being used in a number of high-end and critical applications. They are also appearing at the consumer level. Digital video itself suffers from the same problems that images do, to an even greater degree since video data storage requirements are many times larger than still images. The search and retrieval problems are further compounded by the more complex and rich content contained in video (audio soundtracks, temporal properties, motion properties, all of which are in addition to visual properties).

The present invention is based on a sophisticated video engine to automatically extract as much metadata as possible from the video signal. This involves visual analysis, audio analysis, and other forms of metadata extraction that may be possible in particular situations. The present invention embeds this video engine directly inside the camera equipment such that the output is not only the digital video content, but a corresponding package of metadata which is time indexed to describe the video content. Promising "containers" for this combined video and metadata are the proposed MPEG-4 and MPEG-7 digital multimedia formats, which, such as FlashPix for still images, are designed and intended to embed rich metadata directly in the video format to allow indexing and non-linear access to the video. The current version of QuickTime (on which MPEG-4 is based) is also an ideal container format. While these standards are still under development (and MPEG-7 is several years away) and are not in widespread use, these mechanisms are not required for the present invention. The metadata may be packaged in any form as long as an association with the original content is maintained as the video and metadata are downloaded from the camera into subsequent asset management and post-processing applications.

A novel aspect and benefit of this embedded approach is that "clip marking" can become an automatic part of the videography process. Today, clips (defined by marking IN and OUT points in a video) must be defined in a post-process, usually involving a human to discern the clip boundaries and to add some additional metadata describing the clip. Some camera manufactures (such as Sony) have enhanced their digital camera offerings to automatically generate clip boundaries based on the start and stop of recording segments. In the present invention, this type of automatic clip definition is a starting point for gathering and packaging video metadata. In addition to automatically marking the IN/OUT points, other collateral data may be associated with the clip and become part of the metadata. Often this metadata is already available to the camera electronics, or can be entered by the camera operator. Examples include:

Time/Date

Location

In a Hollywood-type setting, the Scene # and Take #

Any other alpha numeric information that could be entered or selected by the camera operator In one aspect of the present invention, there is an integrated data and real-time metadata capture system, comprising a digital capture device producing a digital representation of one or more forms of media content; a feature extraction engine integrated with the digital capture device, the feature extraction engine having a plurality of feature extractors to automatically extract metadata in real-time from the digital content simultaneously with the capture of the content; and a storage device capable of storing the media content and the metadata, wherein selected portions of the metadata are associated with selected portions of the media content.

In another aspect of the present invention, there is an integrated data and realtime metadata capture method, comprising sensing analog signals, converting the analog signals to a digital representation of one or more forms of media content, compressing the digital media content, automatically extracting metadata in real-time from the digital media content simultaneously with the compressing of the digital media content, and storing the digital media content and the metadata, wherein selected portions of the metadata are associated with selected portions of the digital media content.

BRIEF DESCRIPTION OF THE DRAWINGS

FIG. 2b is a block diagram depicting a conventional method of capturing an image using CCDs (Charge-Coupled Devices) and converting the signals into the digital domain as used in the camera of FIG. 2a.

DETAILED DESCRIPTION OF THE PREFERRED EMBODIMENTS

The following detailed description of the preferred embodiments present a description of certain specific embodiments of the present invention. However, the present invention can be embodied in a multitude of different ways as defined and covered by the claims. In this description, reference is made to the drawings wherein like parts are designated with like numerals throughout.

Figure 1:
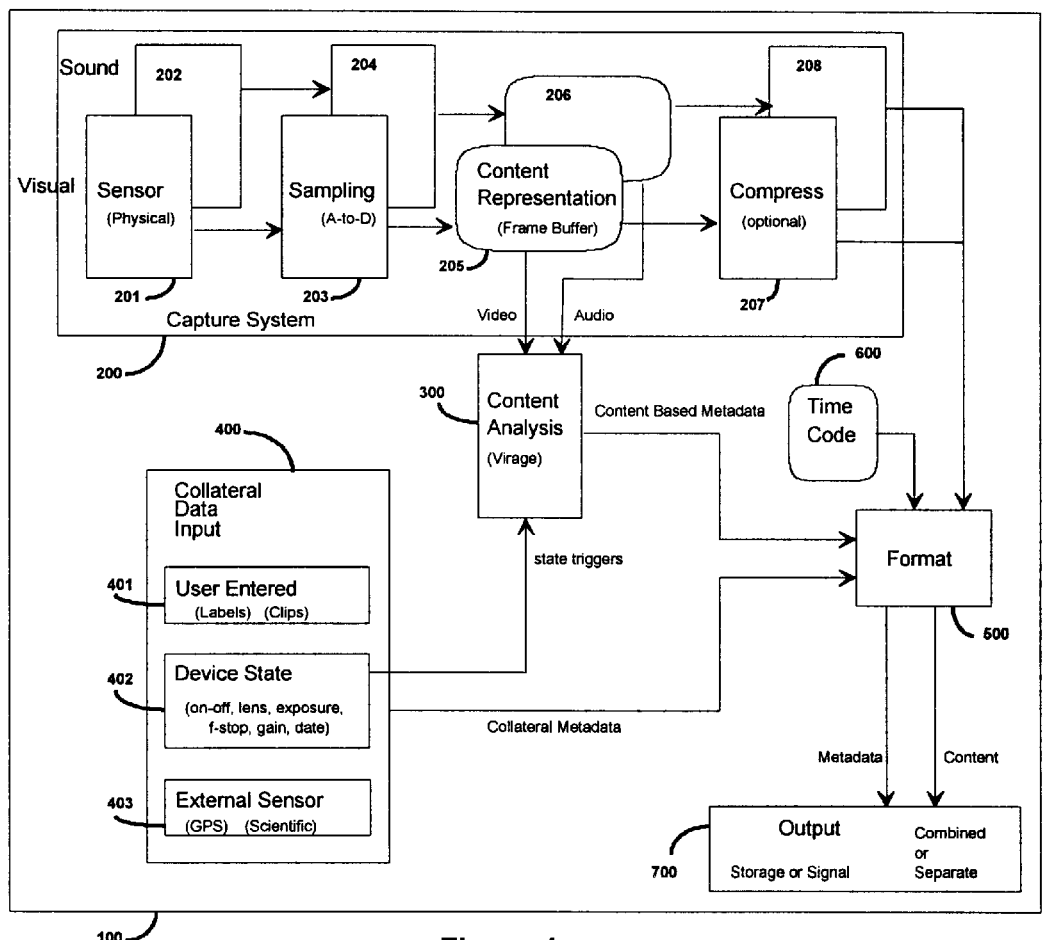
FIG. 1 is a block diagram showing a generic digital capture system containing typical elements found in a digital camera or camcorder, combined with an embedded, real-time, content-based analysis engine and data output.

FIG. 1 is a block diagram that shows the overall system architecture of a digital capture system, 100. The digital capture system 100 comprises a visual and audio capture subsystem 200, a content-based metadata generation engine 300, a collateral data gathering block 400, a data formatting unit 500 with optional time code marking 600, and data output and/or storage 700.

The visual and audio capture subsystem 200 is well known by designers of digital cameras and video recorders. The subsystem 200 may consist of a visual sensor 201 such as a CCD chip, and a microphone 202 if audio is being captured. The output of the sensor(s) is converted to digital form and may be filtered by an analog-to-digital unit 203 (visual), 204 (audio). The digital content is then stored in a memory unit 205, 206, such as a frame buffer for an image or video frame. The digital content may then optionally be compressed 207, 208 prior to being formatted at unit 500 for output or storage 700. If video is being captured, the video frames are time coded with information from the time code generator 600.

The content-based analysis engine 300 accesses the digital representation of the content from the memory 205, 206 to perform metadata extraction. The content analysis and metadata extraction may be affected by device state event triggers coming from block 402, which automatically define video clips in response to the "record" function of the device. Various forms of collateral metadata (metadata that is not based on the content) can be gathered at block 400, including user-provided information (e.g., labels, selections, and annotations) at block 401, device state information (e.g., lens properties, exposure values, f-stops, audio gains, time/date, and so forth) at block 402, and external sensor information (e.g., position derived from GPS satellites, light meter readings, scientific sensor input, and so forth) at block 403.

Content-based metadata from the analysis engine 300 is joined by collateral metadata (not based on the digital content) from block 400 in the formatting unit 500. If the digital content is time based (e.g., audio/video), then the metadata is time coded with timing information from the time code generator 600. This ensures that the metadata is synchronized with the digital content it describes.

For example, in the case of MPEG-7 format, an MPEG-7 stream is a combination of compressed video data, compressed audio data, and metadata. The MPEG-7 standard defines a container format for housing all of this data, and multiplexing it together into a stream. In one embodiment, the formatting unit 500 operates on the encoded audio and video by packetizing, tagging, applying time codes, interleaving, and other similar operations as required by an application. Similarly, the corresponding metadata is packetized and time stamped. The resultant audio, video and metadata packets are then interleaved as "video, audio, and system layers" in the MPEG format. The output of compressors 207/208 is the compressed signal. The formatting unit 500 formats the compressed signal into the MPEG stream.

The formatted output data of the formatting unit 500 can be handled by the output system 700 in a variety of ways. The metadata may be combined with the actual digital content in certain formatting scenarios. Combined formatting makes sure the metadata is always associated with the content as the content moves through its production and archive life cycle. Examples of combined formats that exist today or are emerging in the standards bodies include Kodak's FlashPix image format, Apple QuickTime (and the related MPEG-4 standard), and MPEG-7. Each of these formats contains data structures for placing arbitrary metadata along side the digital content. Further, the output system 700 may take various physical forms, such as a digital tape (examples include D1, D3, D5, DVC, Digital Beta, etc.), a flash RAM card (typically used in digital still cameras), an internal hard disk using a filesystem approach, or a direct digital signal interface with the storage located outside of the capture device (example protocols include serial, parallel, SCSI, digital composite, digital component, and so forth). If the metadata is not combined with the digital content, the metadata may require a separate storage or digital interface mechanism. For example, a digital video camera that outputs digital component video signals may also have a standard RS-232 serial interface for downloading the metadata.

Figure 2A:
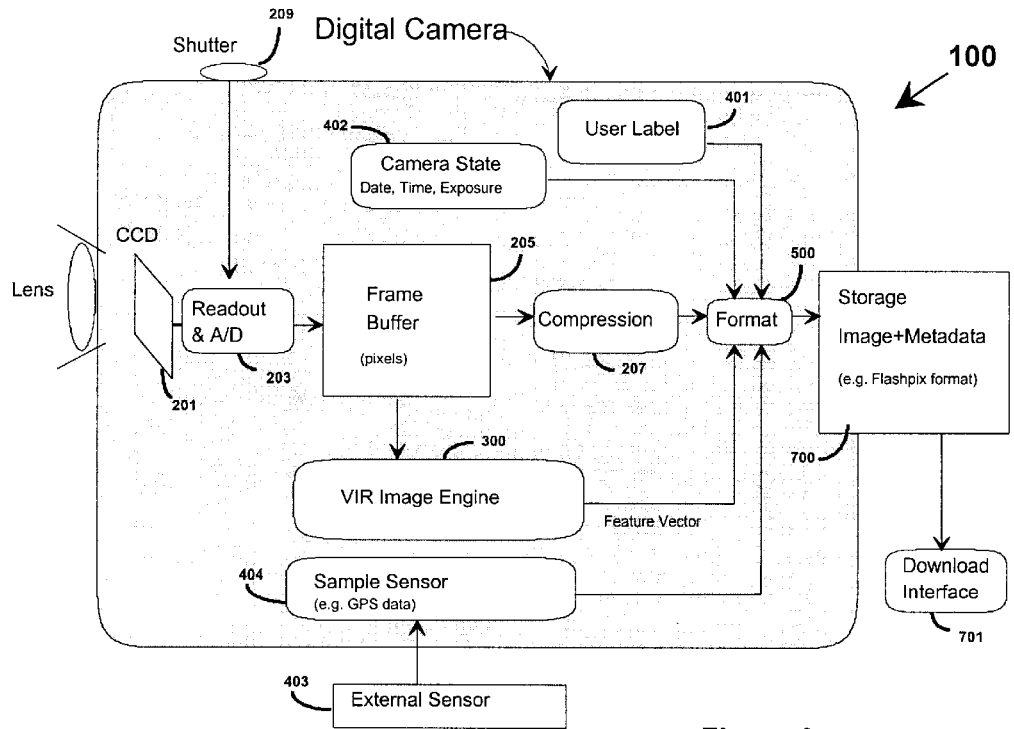
FIG. 2a is a block diagram showing a specific example of combining a content-based metadata engine in a digital still camera, where the image data and metadata are combined and may be stored in a FlashPix container format.

FIG. 2a is a block diagram that shows a specific example of a digital still camera 100 using the Virage VIR Image Engine 300 for metadata capture. The VIR Image Engine 300 is described in U.S. Pat. No. 5,893,095, which is hereby incorporated by reference. The combined metadata and image data is output in a FlashPix container image format in the storage 700. The image may be captured by a CCD sensor 201, although a CMOS based detector may alternatively be used. The sensor output is digitized by an A/D unit 203 in response to the user clicking a shutter mechanism 209. In one embodiment, the captured image is stored temporarily in a frame buffer 205 in an RGB format. Most commercial cameras today employ a compression unit 207 to reduce the storage space required by the image.

The VIR Image Engine 300 accesses the frame buffer 205 to perform a content-based image analysis. In this case, the VIR Image Engine 300 outputs metadata known as a "feature vector" that describes the image content in terms of mathematical quantities. In one embodiment, the mathematical quantities describe the color, shapes, and textures found in the image. One embodiment of the image metadata engine is described in U.S. Pat. No. 5,893,095. The example shown in FIG. 2 may also include an external sensor 403, such as a GPS unit, which captures collateral metadata at a sample device 404 to be associated with the image, as well as a mechanism for the user to input an image label 401 which is also associated with the image. Other collateral metadata may include a camera state 402 (e.g., date, time, exposure, and so forth).

The feature vector metadata and collateral metadata are combined with the compressed image data in the formatting unit 500 to produce a combined metadata and image file, which in this example is a FlashPix formatted file. The storage unit 700 may be a flash RAM card (sometimes referred to a "digital film") which stores the FlashPix container as a file. The storage unit 700 may have a download interface 701 to download the FlashPix data to a computer or other media processing device. It is also possible for the storage unit 700 to be a form of removable media, such as Compact Flash or Smart Media, which can then be interfaced with a computer.

Figure 2B:
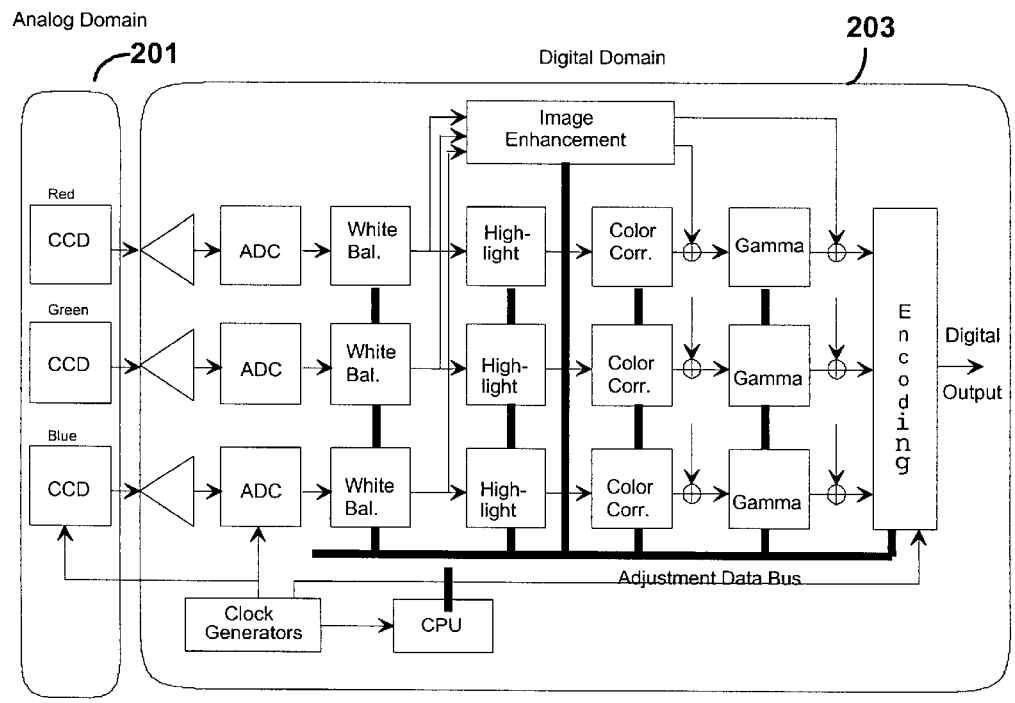

FIG. 2b is a block diagram that shows one embodiment of digital camera signal processing components for capturing an image using CCDs and analog-to-digital converters (ADCs). This diagram is an expanded view of units 201 and 203 from FIG. 2a. The diagram is adapted from FIG. 4.1 of "Video Camera Technology", Arch C. Luther, 1998, and is representitive of current methodologies for capturing and processing image signals into the digital domain.

Figure 3:
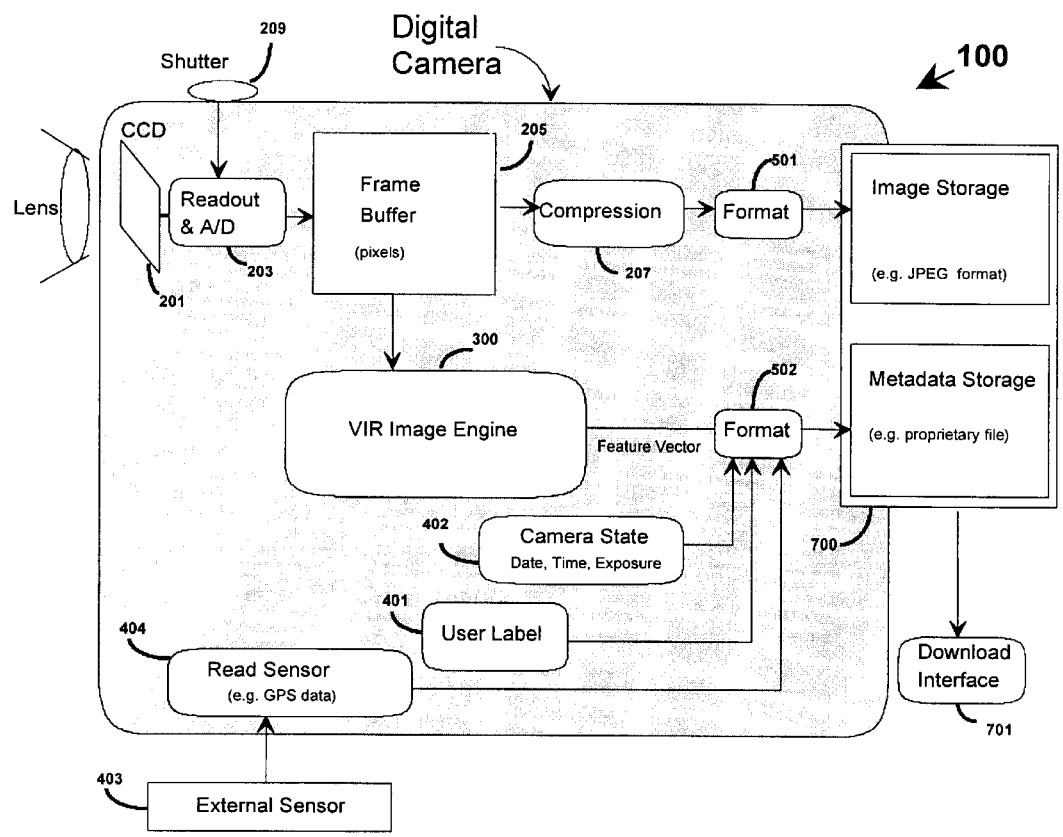
FIG. 3 is a block diagram showing a specific example of combining a content-based metadata engine in a digital still camera, where the image data and metadata are stored separately.

FIG. 3 is a block diagram that shows a specific example of a digital still camera 100 using the Virage VIR Image Engine 300 for metadata capture. The block diagram of FIG. 3 is similar to FIG. 2a, except that the metadata and image data are managed and stored separately in the storage unit 700. Formatting units 501 and 502 separately process the image data and metadata, respectively. The JPEG format is a typical image format in use with digital cameras today, but JPEG does not have provisions for storing arbitrary metadata along with the image. Therefore, in an approach such as shown in FIG. 3, the metadata is formatted by unit 502 in a proprietary, non-standards-based manner, and stored as separate files within the storage unit 700.

Figure 4:
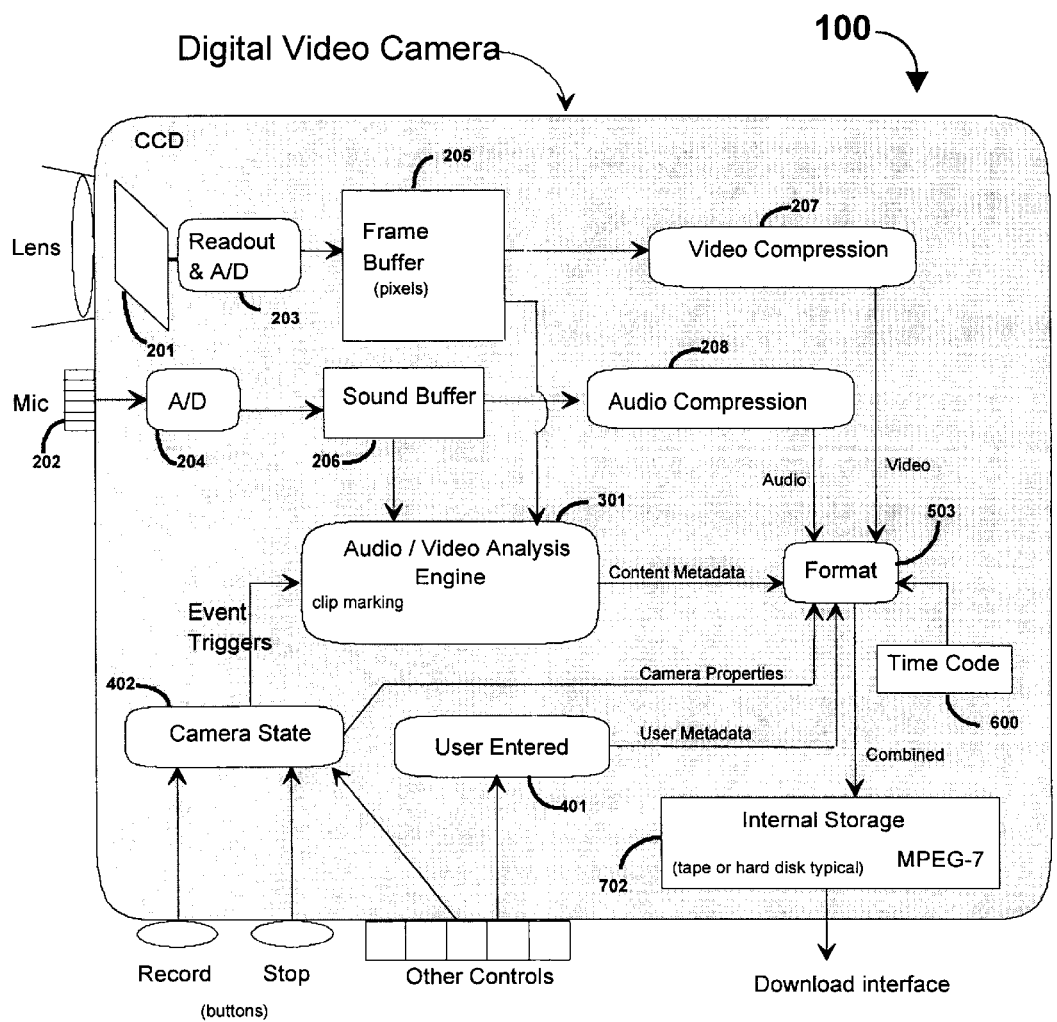
FIG. 4 is a block diagram showing a specific example of combining a content-based metadata engine in a digital video camera which also has collateral metadata input functions. All metadata and audio/video data may be formatted into a combined MPEG-7 container format.

FIG. 4 is a block diagram showing a specific example of a digital video camera 100 containing an embedded content-based analysis engine 301. Digital video frames are captured sequentially by a CCD sensor 201, while audio is captured by a microphone 202. Each of these signals is digitized by an analog-to-digital (A/D) converter 203 and an A/D converter 204, respectively, and the digital signals are stored in the frame buffer 205 and the sound buffer 206, respectively. As with a still camera, the image frame may be stored as an RGB frame buffer 205. Audio information may be digitized as a sequence of 8-bit or 16-bit waveform samples at a suitable sampling frequency, such as 44.1 kHz (for CD quality audio). Both the video frames and the audio signal may be compressed by a video compressor 207 and an audio compressor 208, respectively, to reduce storage requirements. There are many compression schemes currently practiced in the industry, such as simple intra-frame compression (e.g., MotionJPEG) to more advanced inter-frame compression schemes (e.g., DV and MPEG), which also include data tracks for compressed audio.

The frame buffer 205 and sound buffer 206 are accessed by the audio/video analysis engine 301 which performs metadata extraction. In this example, the Virage audio and video engines are offered as suitable examples for function 301, and are further described in U.S. patent applications Ser. No. 09/134,500, entitled "Video Cataloger System with Audio Track Extraction", and Ser. No. 09/134,497, entitled "Video Cataloger System with Synchronized Encoders", which are hereby incorporated by reference. FIG. 4 also shows collateral metadata gathered from the camera state block 402, and user entered labels and annotations block 401. Changes in the camera state at block 402 can cause event triggers that facilitate clip marking by the analysis engine 301, such as caused by record function on/off events. User entered metadata at the output of block 401 may be as simple as a one-line text label, or as complex as marking a video clip's in-time, out-time, and text description.

Content-based metadata from the analysis engine 301 and collateral metadata from blocks 402 and 401 are sent to a formatting unit 503, where time codes from the time code generator 600 are applied to synchronize the metadata with the video content. Output from the formatter 503 is (in this example) in the form of an MPEG-7 stream, which functions as a data container that packages the compressed audio/video stream with the metadata. The MPEG-7 stream then passes to an internal storage unit 702, which may be a digital tape, a hard disk, or other storage media. The storage unit 702 may then download the MPEG-7 data to a host computer or other media processing device through a download interface. Media processing functions may include media editing, media asset management, telecine, video and audio post processing, paint boxes, and so forth.

Figure 5:
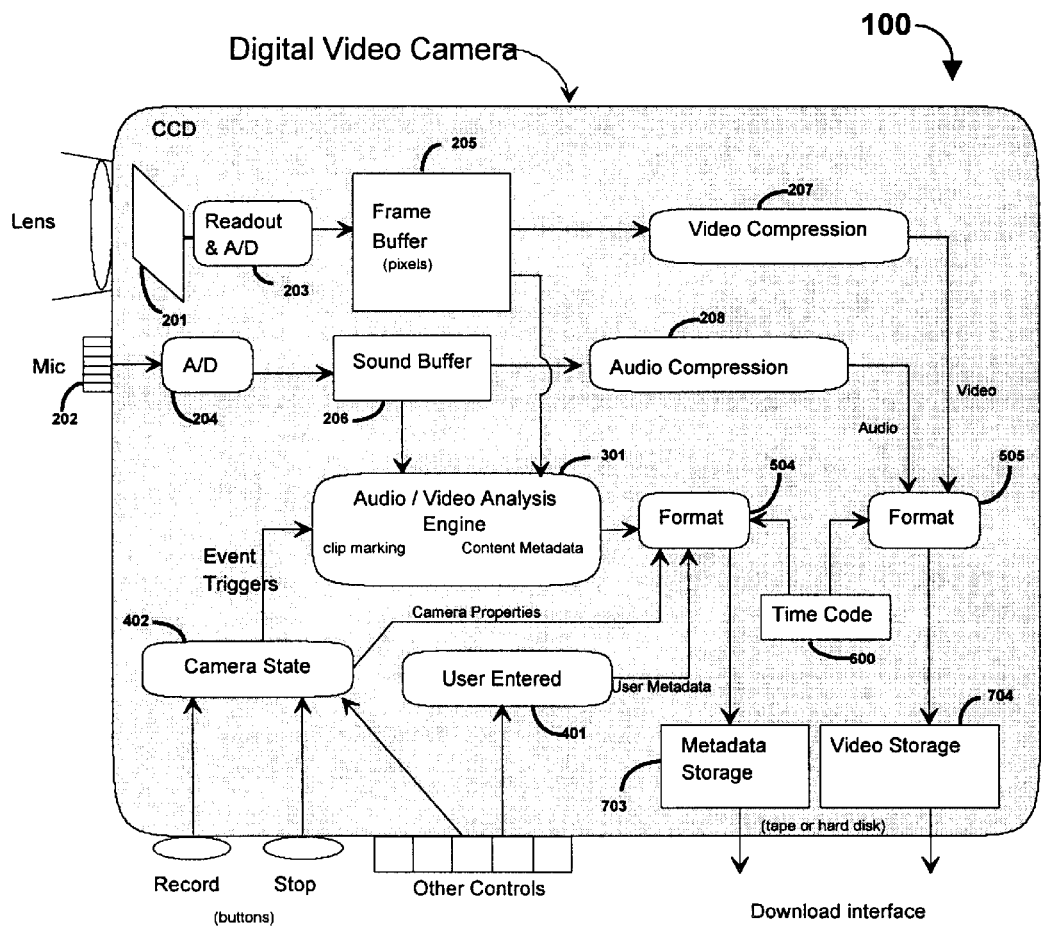
FIG. 5 is a block diagram showing a specific example of combining a content-based metadata engine in a digital video camera which also has collateral metadata input functions. Metadata is formatted and stored separately from the audio/video data.

FIG. 5 is a block diagram that shows a specific example of a digital video camera 100 using the embedded content-based analysis engine 301 for metadata capture. The block diagram of FIG. 5 is similar to FIG. 4, except that the audio/video content and the metadata are managed and stored separately. Formatting units 504 and 505 handle the metadata and video content formatting operations separately. The video storage 704 could use any of the currently existing digital tape formats (e.g., D1, D3, D5, DV, Digital Betacam, etc.), while the metadata storage 703 may be a proprietary format stored separately on a hard disk or internal memory. In this situation, the metadata can be downloaded by a standard RS-232 serial interface, USB bus, or other standard computer interface. Some digital tape formats have a feature known as "MIC", or Memory In Cassette, that allows metadata to be stored on a non-volatile RAM chip contained in the digital tape housing. This allows the metadata to "travel" with the video content, even though the two data streams are not combined into a unified format.

Figure 6:
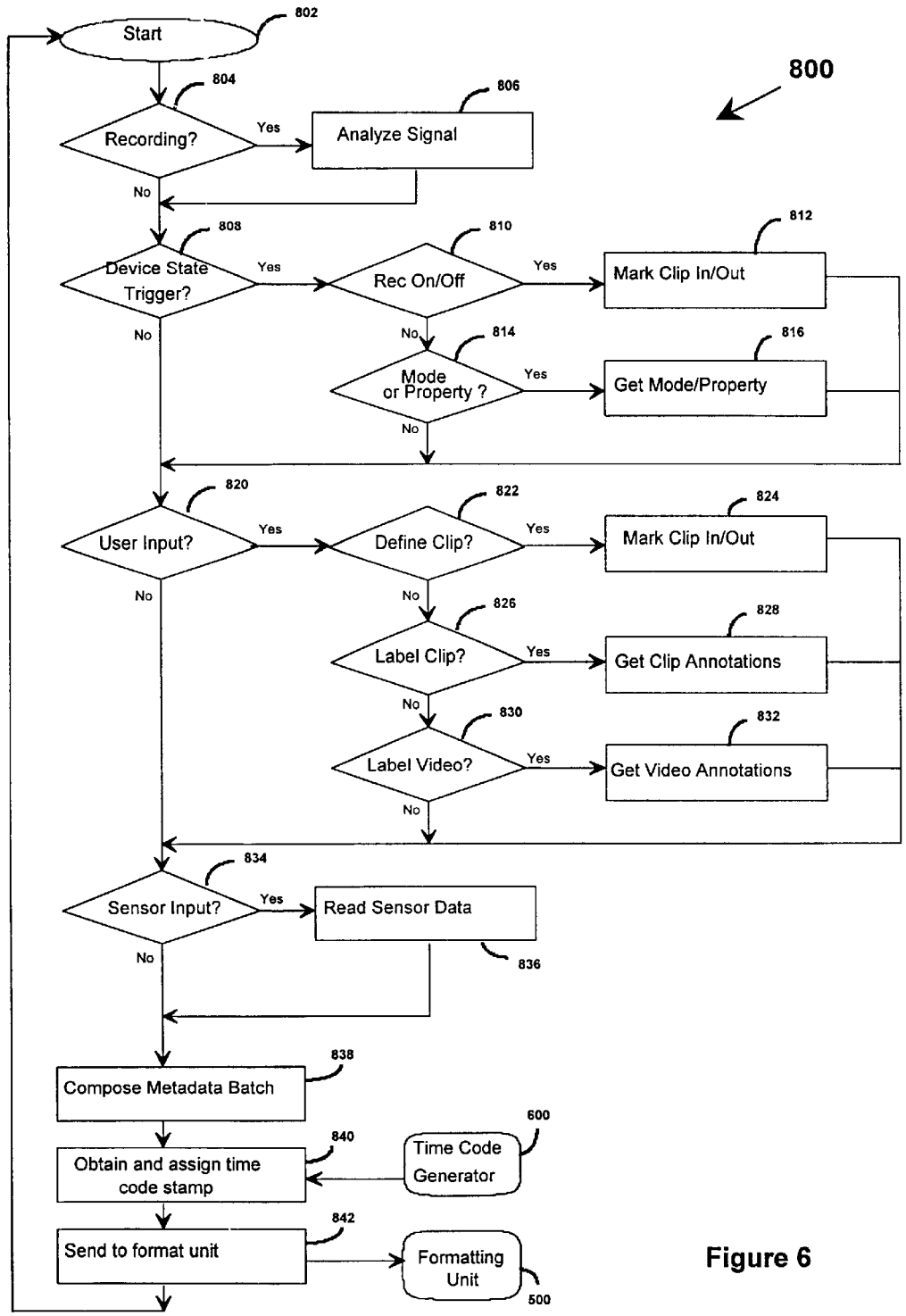
FIG. 6 is a flowchart showing a generic metadata collection process within a digital capture device such as shown in FIGS. 1–5.

FIG. 6 is a flowchart that shows a metadata collection process 800 that occurs inside the digital capture device such as a digital video camera. The main loop of this process checks the sources of metadata and gathers any available metadata. The main loop then time-stamps the metadata and sends it to a formatter, such as the formatter 500. This loop (states 804 to 842) processes rapidly, such as 10 to 30 times per second so as to analyse and capture the metadata in real-time.

At the beginning of the loop, the first check is to see if the device is in a record function at state 804. If it is recording, then the flow of control passes to 806 for the content-based signal analysis to take place. This function may be performed, for example, by the media analysis portion of the Virage Extensible Video Engine described in Virage U.S. patent application Ser. No. 09/134,498, which is hereby incorporated by reference. Or it may be a more limited metadata extraction process, such as performing speech-to-text transcription or keyword spotting. An example of such a module is the Virage Audio Engine, whose architecture is described in U.S. patent application Ser. No. 09/134,500. Any metadata generated by this function 806 is added to a metadata batch under construction.

The next check is to see if any device state triggers have occurred at a decision state 808. If a record mode on/off state change has occurred, as determined at decision state 810, the event time is used to mark either the beginning (on) or ending (off) of a video clip. A clip marking function 812 notifies the content-based analysis engine of the event, which may cause additional actions such as grabbing a keyframe to mark the clip beginning or end. Keyframe selection is described in Applicant's U.S. patent application Ser. No. 08/870,836, which is hereby incorporated by reference. In the context of the analysis engine description in U.S. patent application Ser. No. 09/134,498, the marking of clips drives the same control logic that is driven by the graphical user interface in the preferred embodiment of that application. Any metadata generated by this function 812 is added to the metadata batch under construction.

If a property or mode of the device has changed state, as determined at a decision state 814, this information is gathered by function 816 in the form of textual annotations, and added to the metadata batch under contruction.

The next check is to see if any user input has occurred at a decision state 820. There are several possible areas of user input, depending on the features and functions provided by the camera designer. In this example, the specific features of defining and labeling a video clip, and labeling the video as a whole are considered.

If the user has chosen to define a video clip, as determined at a decision state 822, the camera interface provides a way for selecting the begin and end times of the clip. This information is gathered by a clip marking function 824, and is added to the metadata batch under contruction.

If the user has chosen to label a video clip, as determined at a decision state 826, the camera interface provides a way for selecting the clip to be labeled, and entering text or selecting from a set of pre-defined labels. This annotation or set of annotations is gathered by a clip annotation function 828, and is added to the metadata batch under contruction.

If the user has chosen to label the entire video, as determined at a decision state 830, the camera interface provides a way for entering text or selecting from a set of pre-defined labels. This annotation or set of annotations is gathered by a video annotation function 832, and is added to the metadata batch under contruction.

A final source for metadata to be checked is one or more external sensors, as determined at a decision state 834. Examples of external sensors are GPS receivers, light meters, color temperature meters, thermometers, and so on. A sensor data gathering function 836 reads any available data, and adds it to the metadata batch under construction.

Once all the metadata is gathered for the current pass, it is composed into a data structure by function 838. Then the metadata batch is time-stamped at function 840 by obtaining the current device time code value from the time code generator 600. In one embodiment, SMPTE time code is used, in the form HH:MM:SS:FF (where FF is the frame count). Finally, at state 842, the complete metadata package is sent to the format unit 500 for preparation for storage.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. An integrated data and real-time metadata capture system, comprising:
    a digital capture device producing a digital representation of one or more forms of media content;
    a feature extraction engine integrated with the digital capture device, the feature extraction engine having a plurality of feature extractors to automatically extract metadata in real-time from the digital content simultaneously with encoding of the content;
    a storage device capable of storing the encoded media content and the metadata, wherein selected portions of the metadata are associated with selected portions of the encoded media content; and
    an output interface in data communication with the storage device and generating output data, wherein the output interface is capable of preserving a temporal relationship between a sequence of the metadata and the digital content,
    wherein the digital capture device comprises a digital video camera including an audio capture capability, and wherein the feature extraction engine generates a plurality of time-based tracks of metadata that index the audio content and the video content.

2. The system defined in claim 1, additionally comprising at least one collateral metadata source, wherein the collateral metadata is simultaneously captured with the media content.

3. The system defined in claim 2, wherein the collateral metadata source includes at least one of the following: user input, device properties, and external sensors.

4. The system defined in claim 2, wherein the digital video camera is capable of marking a video clip, wherein the marking is automatically triggered by a recording process of the camera.

5. The system defined in claim 4, wherein the collateral metadata is associated with the video clip and is stored on the storage device with the metadata.

6. The system defined in claim 5, wherein the collateral metadata includes at least one of the following: time/date, location, or scene/take.

7. The system defined in claim 1, wherein the metadata comprises keyframes.

8. The system defined in claim 1, wherein the metadata comprises a plurality of feature vectors.

9. The system defined in claim 1, wherein the output data comprises a FlashPix image containing image feature vectors as auxiliary metadata within an image file.

10. The system defined in claim 1, wherein the output data comprises an MPEG-7 digital video file containing the plurality of metadata tracks as embedded metadata within an MPEG-7 metadata framework.

11. The system defined in claim 1, additionally comprising a format module configured to associate a time code with the encoded media content and the metadata.

12. The system defined in claim 1, additionally comprising a time code module configured to provide a time code for association with the encoded media content and the metadata.

13. The system defined in claim 1, wherein the storage device comprises separate storages for the encoded media content and the metadata.

14. An integrated data and real-time metadata capture system, comprising:
    a digital capture device producing a digital representation of one or more forms of media content;
    a feature extraction engine integrated with the digital capture device, the feature extraction engine having a plurality of feature extractors to automatically extract metadata in real-time from the digital content simultaneously with encoding of the content; and
    a storage device capable of storing the encoded media content and the metadata, wherein selected portions of the metadata are associated with selected portions of the encoded media content, and wherein the storage device comprises separate storages for the encoded media content and the metadata.

15. The system defined in claim 14, additionally comprising at least one collateral metadata source, wherein the collateral metadata is simultaneously captured with the media content.

16. The system defined in claim 15, wherein the collateral metadata source includes at least one of the following: user input, device properties, and external sensors.

17. The system defined in claim 15, wherein the digital capture device comprises a digital video camera capable of marking a video clip, wherein the marking is automatically triggered by a recording process of the camera.

18. The system defined in claim 17, wherein the collateral metadata is associated with the video clip and is stored on the storage device with the metadata.

19. The system defined in claim 18, wherein the collateral metadata includes at least one of the following: time/date, location, or scene/take.

20. The system defined in claim 14, additionally comprising an output interface in data communication with the storage device and generating output data, wherein the output interface is capable of preserving a temporal relationship between a sequence of the metadata and the digital content.

21. The system defined in claim 20, wherein the digital capture device comprises a digital still camera, and the output data comprises a FlashPix image containing image feature vectors as auxiliary metadata within an image file.

22. The system defined in claim 20, wherein the digital capture device comprises a digital video camera including an audio capture capability.

23. The system defined in claim 22, wherein the feature extraction engine generates a plurality of time-based tracks of metadata that index the audio content and the video content.

24. The system defined in claim 14, wherein the digital capture device comprises a digital still camera.

25. The system defined in claim 24, wherein the metadata comprises a plurality of feature vectors.

26. The system defined in claim 14, additionally comprising a format module configured to associate a time code with the encoded media content and the metadata.

27. The system defined in claims 14, additionally comprising a time code module configured to provide a time code for association with the encoded media content and the metadata.

28. An integrated data and real-time metadata capture method, comprising:

sensing analog signals;

converting the analog signals to a digital representation of one or more forms of media content;

compressing the digital media content;

automatically extracting metadata in real-time from the digital media content simultaneously with the compressing of the digital media content; and storing the compressed digital media content and the metadata, wherein selected portions of the metadata are associated with selected portions of the digital media content, and wherein the storing includes storing to separate storage devices for the digital media content and the metadata.

29. The method defined in claim 28, wherein automatically extracting metadata in real-time includes extracting a plurality of feature vectors from the digital media content.

30. The method defined in claim 28, additionally comprising associating a time code with the digital media content and the metadata.

31. The method defined in claim 28, additionally comprising generating a time code for association with the digital media content and the metadata.

32. An integrated data and real-time metadata capture system, comprising:

a digital capture device producing a digital representation of one or more forms of media content;

a frame buffer storing a frame of the digital content;

a feature extraction engine integrated with the digital capture device, the feature extraction engine having a plurality of feature extractors to automatically extract metadata in real-time from the digital content stored in the frame buffer, and wherein the feature extraction engine generates a plurality of time-based tracks of metadata that index audio content and video content; and a storage device capable of storing the digital content and the metadata, wherein selected portions of the metadata are associated with selected portions of the digital content.

33. The system defined in claim 32, additionally comprising at least one collateral metadata source, wherein the collateral metadata is simultaneously captured with the media content.

34. The system defined in claim 32, additionally comprising a format module configured to associate a time code with the digital content and the metadata.

35. The system defined in claim 32, additionally comprising a time code module configured to provide a time code for association with the digital content and the metadata.

36. The system defined in claim 32, wherein the storage device comprises separate storages for the digital content and the metadata.

37. An integrated data and real-time metadata capture system, comprising:

a digital capture device producing a digital representation of one or more forms of media content;

a frame buffer storing a frame of the digital content;

a feature extraction engine integrated with the digital capture device, the feature extraction engine having a plurality of feature extractors to automatically extract metadata in real-time from the digital content stored in the frame buffer; and a storage device capable of storing the digital content and the metadata, wherein selected portions of the metadata are associated with selected portions of the digital content, and wherein the storage device comprises separate storages for the digital content and the metadata.

38. The system defined in claim 37, additionally comprising at least one collateral metadata source, wherein the collateral metadata is simultaneously captured with the media content.

39. The system defined in claim 37, wherein the feature extraction engine generates a plurality of time-based tracks of metadata that index audio content and video content.

40. The system defined in claim 37, additionally comprising a format module configured to associate a time code with the digital content and the metadata.

41. The system defined in claim 37, additionally comprising a time code module configured to provide a time code for association with the digital content and the metadata.

* * * * *